US008635584B2

(12) United States Patent
Jones et al.

(10) Patent No.: US 8,635,584 B2
(45) Date of Patent: Jan. 21, 2014

(54) TUTORIAL SYSTEMS FOR CODE CREATION AND PROVENANCE TRACKING

(75) Inventors: M. Cameron Jones, Seattle, WA (US); Elizabeth F. Churchill, San Francisco, CA (US); David Ayman Shamma, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 760 days.

(21) Appl. No.: 12/578,480

(22) Filed: Oct. 13, 2009

(65) Prior Publication Data

US 2011/0088009 A1    Apr. 14, 2011

(51) Int. Cl.
*G06F 9/44* (2006.01)
(52) U.S. Cl.
USPC .......................................................... 717/100
(58) Field of Classification Search
None
See application file for complete search history.

(56) References Cited

U.S. PATENT DOCUMENTS

| | | | | |
|---|---|---|---|---|
| 5,103,498 A | * | 4/1992 | Lanier et al. | 706/58 |
| 5,325,478 A | * | 6/1994 | Shelton et al. | 715/236 |
| 5,859,637 A | * | 1/1999 | Tidwell, II | 715/708 |
| 5,860,071 A | * | 1/1999 | Ball et al. | 707/695 |
| 6,262,730 B1 | * | 7/2001 | Horvitz et al. | 715/707 |
| 6,366,933 B1 | * | 4/2002 | Ball et al. | 715/203 |
| 6,596,030 B2 | * | 7/2003 | Ball et al. | 715/234 |
| 6,681,369 B2 | * | 1/2004 | Meunier et al. | 715/255 |
| 6,871,340 B1 | * | 3/2005 | Gillis | 717/100 |
| 6,874,124 B2 | * | 3/2005 | Murase et al. | 715/255 |
| 7,051,031 B2 | * | 5/2006 | Schein | 707/697 |
| 7,313,588 B1 | * | 12/2007 | Shotton et al. | 709/202 |
| 7,351,064 B2 | * | 4/2008 | Johnson et al. | 434/365 |
| 7,610,545 B2 | * | 10/2009 | Wagner et al. | 715/200 |
| 7,680,881 B2 | * | 3/2010 | Knapp et al. | 709/203 |
| 7,849,399 B2 | * | 12/2010 | Hoffmann | 715/229 |
| 7,984,384 B2 | * | 7/2011 | Chaudhri et al. | 715/779 |
| 8,086,700 B2 | * | 12/2011 | Davis et al. | 709/219 |
| 8,175,922 B2 | * | 5/2012 | Jones et al. | 705/14.73 |
| 2002/0099695 A1 | * | 7/2002 | Abajian et al. | 707/3 |
| 2004/0091232 A1 | * | 5/2004 | Appling, III | 386/46 |
| 2006/0020631 A1 | * | 1/2006 | Cheong Wan et al. | 707/104.1 |
| 2007/0288247 A1 | * | 12/2007 | Mackay | 705/1 |
| 2008/0096174 A1 | * | 4/2008 | Bodlaender et al. | 434/308 |
| 2008/0195543 A1 | * | 8/2008 | Turner | 705/50 |
| 2008/0216052 A1 | * | 9/2008 | Hejlsberg et al. | 717/114 |
| 2009/0082003 A1 | * | 3/2009 | Thorell | 455/419 |
| 2009/0150472 A1 | * | 6/2009 | Devarakonda et al. | 709/201 |
| 2009/0199090 A1 | * | 8/2009 | Poston et al. | 715/255 |
| 2010/0030870 A1 | * | 2/2010 | Davis et al. | 709/219 |
| 2010/0031144 A1 | * | 2/2010 | Farrington et al. | 715/712 |
| 2010/0054526 A1 | * | 3/2010 | Eckles | 382/100 |
| 2010/0106681 A1 | * | 4/2010 | Povzner et al. | 707/608 |

OTHER PUBLICATIONS

"Creating an Interactive Tutorial for a Web-Based Product" by Samantha Shurety, IBM Canada, 1998 ACM 1-58113-004-XI98IOOO9.*

(Continued)

*Primary Examiner* — Henry Tsai
*Assistant Examiner* — Jing-Yih Shyu
(74) *Attorney, Agent, or Firm* — Weaver Austin Villeneuve & Sampson LLP

(57) ABSTRACT

The disclosed embodiments of computer systems and techniques facilitate creation and retrieval of software code. Provenance tracking at the step level allows for each step to be tracked to its original creator and to various remixes of the original in the line of provenance.

29 Claims, 13 Drawing Sheets

(56) References Cited

OTHER PUBLICATIONS

"Widget Creation Tutorial," Konfabulator: How to build a Widget, Archived on Oct. 30, 2005, 25 pages [online] [retrieved on Jun. 26, 2012] retrieved from the internet <URL:http://web.archive.org/web/*/http://www.widgetgallery.com/downloads/Widget_Creation_Tutorial.pdf>.*

"Creating an Interactive Tutorial for a Web-Based Product" by Samantha Shurety, IBM Canada, 1998 ACM 1-58113-004-X98/0009.*

"Track Changes in Word 2007" by Andrew Willden, Fall 2007, http://www.cwu.edu/-writingcenter/handouts/other/track changes wd2007.pdf.*

"Tracking and Viewing Changes on theWeb" by Fred Douglis and Thomas Ball, AT&T Bell Laboratories, 1996 USENIX Technical Conference.*

* cited by examiner

TUTORIAL SYSTEMS FOR CODE CREATION AND PROVENANCE TRACKING

BACKGROUND OF THE INVENTION

This invention relates generally to instructional code for microprocessors and more particularly to tools and systems for efficiently developing code.

Currently, the search engine is the primary mechanism by which people are finding code resources on the web. However, the search engine is not a very effective tool for this practice as there is little way to evaluate the quality of resources found. Also, effective monetization of this kind of search behavior is problematic as programming keywords are not usually general-language terms, and thus not likely to be chosen by advertisers for sponsored search.

Furthermore, the tools for creating code and instructing others how to do so are limited in functionality.

SUMMARY OF THE INVENTION

The disclosed embodiments comprise systems and methods for the development of software code, and associated tutorials for assembling software code and other materials to produce a finished end product.

Code tutorials ("codals") comprise a mix of program code snippets, narrative description, and working executable examples. Tutorials are linked not only to original resource objects including program source code documents, text, images, and videos etc., but also to each other, allowing tutorials to build off of one another, reusing and remixing existing content appropriate to multiple levels of expertise. Snippets comprise a resource identifier and boundary specification specifying the origins in terms of location and specific portion of material taken from original resource objects.

The system may be used not only to generate tutorials but also to organize and search them. For example, it may be used to find common patterns of coding across tutorials as a method for refactoring APIs, etc. Common patterns of coding may be used as material for readily copy-able snippets. Similar tutorials may be grouped by their shared code snippets and the system can identify alternative implementations or explanations, and offer them to the user as added information. The system, in one aspect, may include a memory and a processor. The memory may store program source code, documents, text, images, videos etc. The processor may be operable to integrate the snippet and narrative description into a tutorial, as described herein.

Embodiments allow a user to provide a link back to the full source context. This may be used for any number of things such as voting, favoriting, tagging, and commenting etc. Images, screenshots, and screencasts etc. may be annotated with links between interface elements and rendering code (e.g., firefox—view selection source; firebug—inspect element; etc). In certain embodiments, screencasts are automatically generated from snippets and narratives. Text-to-speech audio tracks may also be included in a codal. For audio tracks, both temporal bounds and channels or tracks may be excerpted and linked.

One aspect relates to a computer system for creating instructional tutorials and tracking provenance of materials incorporated or referenced therein. The computer system is configured to: select material from original resource objects or derivatives thereof; define the selected material by a universal resource identifier and a boundary specification; excerpt the selected material and create a snippet from the excerpted material; and integrate the snippet and a narrative description into a tutorial. The system is further configured to track the provenance of the selected material and the snippet back to an original resource object of the original resource objects, including any intermediate derivatives of the material within a chain of provenance, and to reference the original resource object and any intermediate contributors to derivatives in a line of provenance in the tutorial.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention. All papers referenced herein are hereby incorporated by reference in the entirety.

Programmers make heavy use of web resources when programming, often copying and pasting code examples from various web resources as a way of scaffolding and building applications. This behavior has various conceptual names: just-in-time learning, opportunistic programming, appropriation, remixing software, software reuse, copy-paste programming, snarf and barf programming, clone and modify, etc. Whatever the label, the practice is prevalent and arguably increasing as more code is stored and documented in web-accessible repositories, indexed and searchable with web search engines.

Embodiments facilitate this type of programming and keep track of the resources and remixes and modifications of the resources. Thus, updates to material referenced in a tutorial created by the disclosed embodiments can be noted and made accessible after the tutorial has been created. Also, there are several layers of provenance information being tracked in the disclosed embodiments, as will be described in greater detail below. Provenance can be tracked even through multiple samplings of material, only a portion of which may have been incorporated into an intermediate link in the chain of provenance. By recursively following the link between a derivative and its source, a chain of provenance can be reconstructed which connects any derivative to an ancestry of sources.

Figure 1:
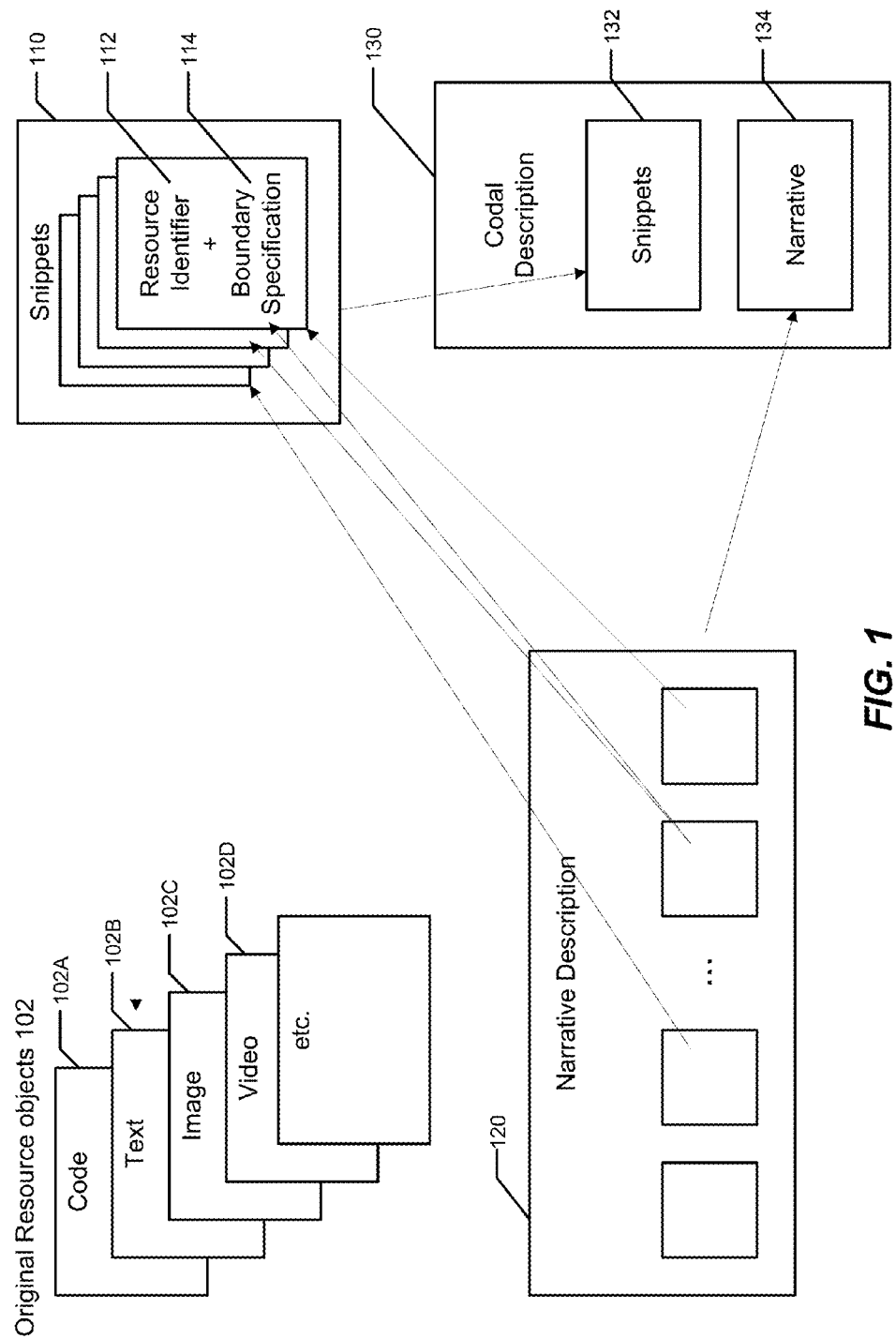
FIG. 1 is an illustration of materials utilized and created by the disclosed embodiments.

The codal system has social and community aspects and comprises a web site where members can browse, view, and create programming tutorials. An example infrastructure of such a system is seen in FIG. 4G which will be described later. As seen in FIG. 1, these code tutorials ("codals") 130 comprise a mix of program code snippets 132, narrative description 134, and working executable examples (not shown). Tutorials are linked, not only to original resource objects 102 including program source code documents 102A, text 102B, image 102C, video 102D etc., but also to each other (other snippets 110), allowing tutorials to build off of one another, reusing and remixing existing content which is appropriate to multiple levels of expertise.

Snippets 110 comprise a resource identifier 112 and boundary specification 114 specifying the origins in terms of location and specific portion of material taken from original resource objects 102. These snippets 110 may in turn be incorporated into a codal 130 either in whole or in part, and are represented by snippets 132 within codal 130. While codal derives from the term code tutorial, and in certain embodiments is just that, a codal is not limited to a code tutorial. For example a codal may in some embodiments be any type of instructional or informational composition related to any topic. Narrative descriptions 120 may be incorporated into snippets 110 and then into a codal 130 or may be directly incorporated into a codal 130.

Tutorial documents (i.e. codals) may comprise snippets that are drawn from live, web-based, code repositories (e.g., Github, a well-known web-based hosting service for software development projects). When a user wants to embed a snippet, he provides the link information for the web repository, and the system displays a view of the source code. The user selects the regions of code to embed in the tutorial, and the system stores a link to the code, with an indication of which regions were extracted. By maintaining a live link to the original source code, this allows the snippets in the tutorial to be updated if the underlying code from which they are drawn is updated.

Figure 2A:
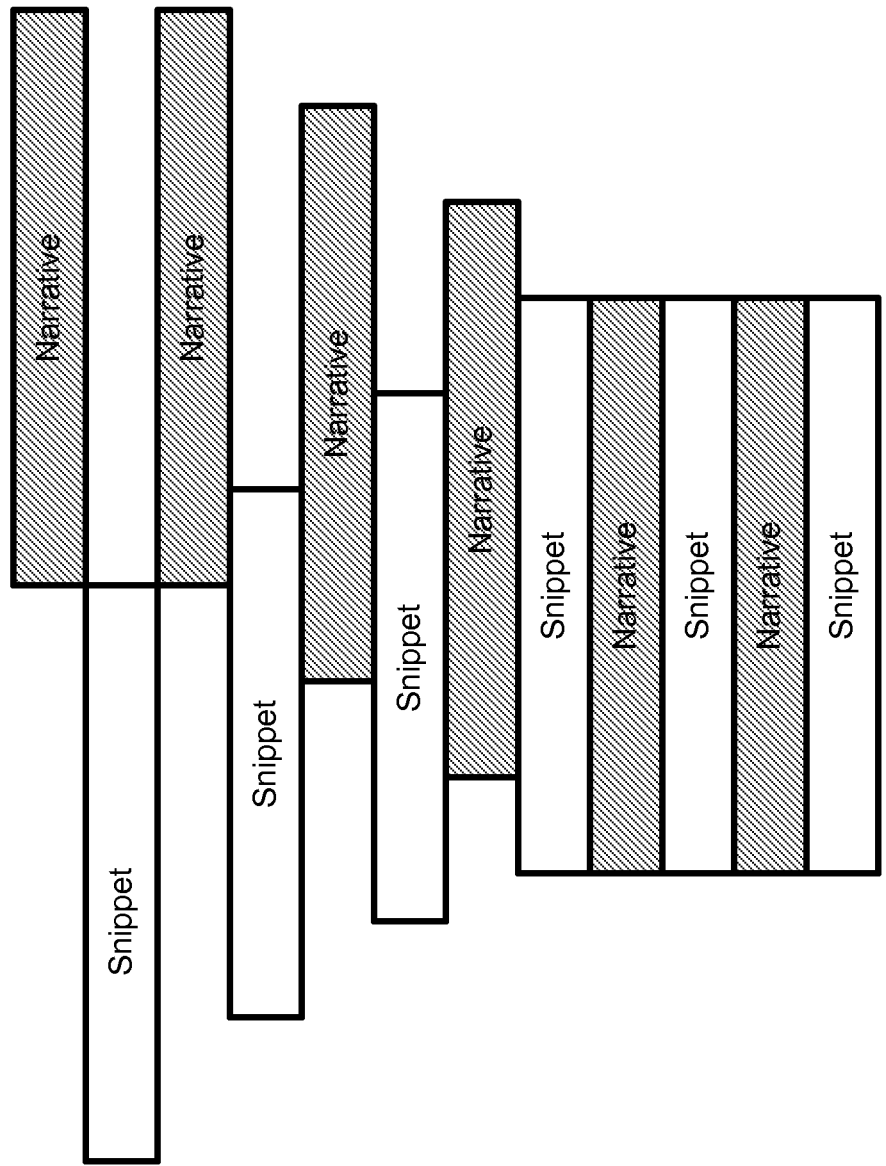
FIGS. 2A, 2B, and 2C are illustrations of weighting and interleaving snippets and narrative elements in a tutorial.
Figure 2B:
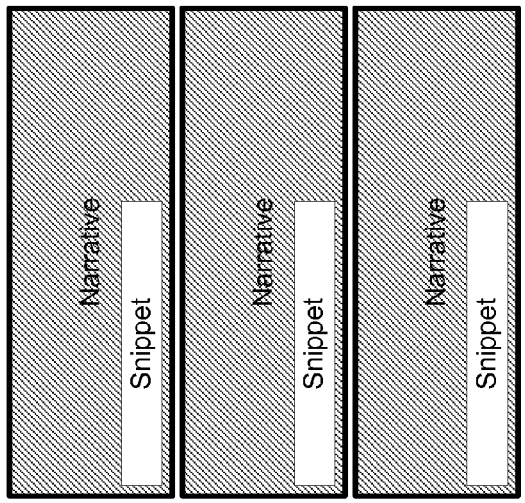
Figure 2C:
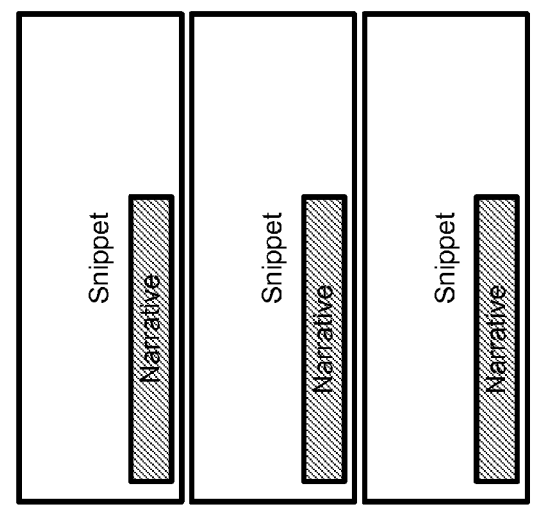

The links maintained by the system between snippets and original source code also allow the user to view the snippets in the broader context of the original source and vice-versa, providing additional annotation for the code and/or snippet (e.g., code comments pulled into tutorial, tutorial narrative linked to original source code). Tutorials are a combination of narrative steps and snippets, with a mapping between which snippets are associated with which steps: allowing the tutorial to be woven together as a linear narrative with embedded snippets, or unwoven into a series of snippets where the narrative is de-emphasized, or even removed. The relative prominence of the code-view over the narrative (and vice-versa) is adjustable by the user. As seen in FIG. 2A, snippets and narrative can be dynamically interwoven, and given relative weights or emphasis to the viewer. As seen in FIG. 2B, a viewer of the tutorial can foreground the narrative elements, while de-emphasizing the snippets. Likewise, as seen in FIG. 2C, the snippets may be foregrounded while the narrative is de-emphasized.

Figure 3:
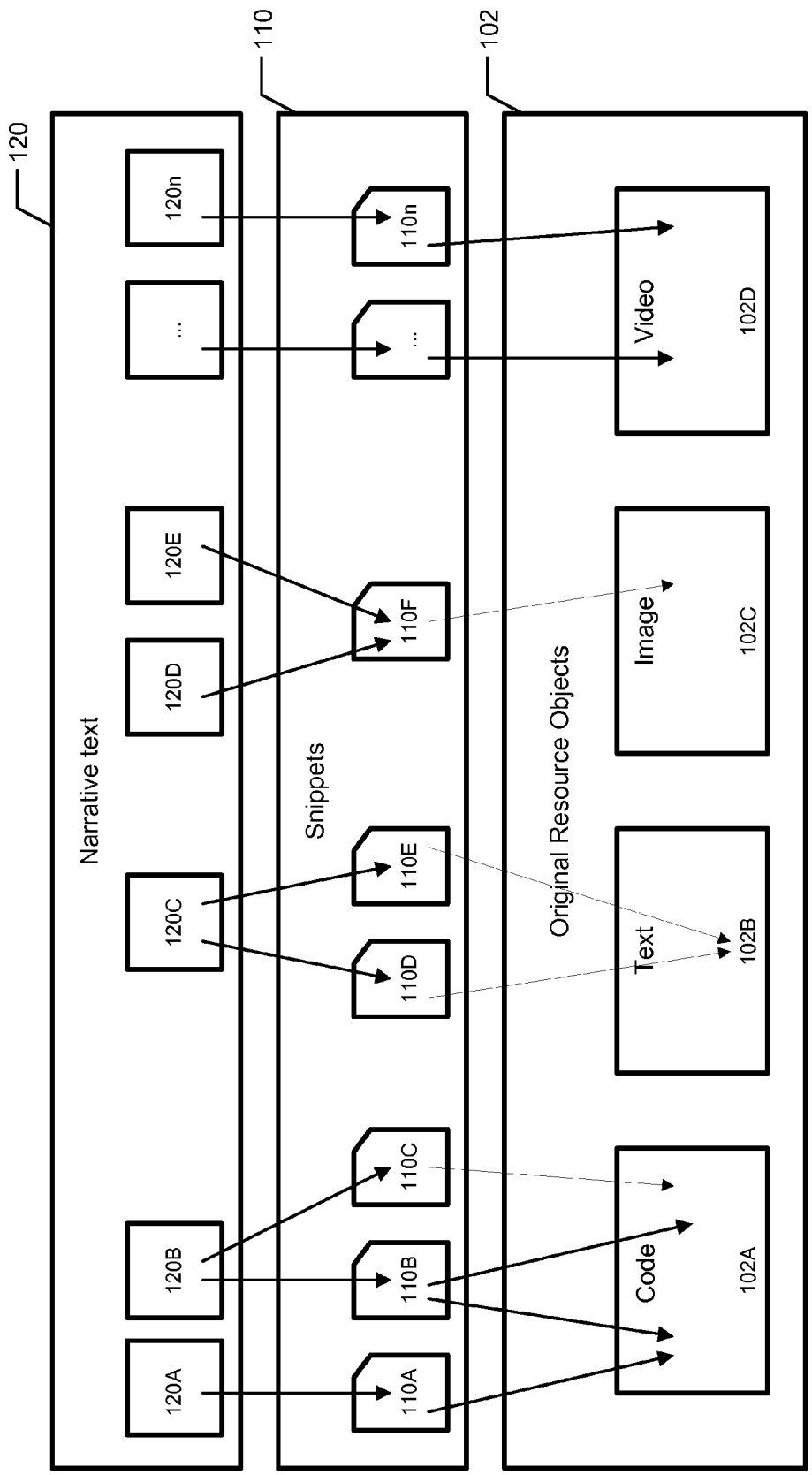
FIG. 3 illustrates mapping between objects incorporated in and referenced by a tutorial.

As seen in FIG. 3, snippets 110 may be used to map narratives (which are typically readily indexed) to media objects that are difficult to index, allowing searches to match user intent to resources. Because of this mapping within a codal and/or the associated infrastructure, when a general purpose search engine is used, the results will point to the intended objects through the codal, and the user's intent will be better realized through the codal.

Code snippets in certain embodiments may be dynamic, or in other words will be updated when an underlying object such as source code (repository) is updated. Also external code in some embodiments will link to examples in a tutorial and may call the tutorial remotely.

Figure 4A:
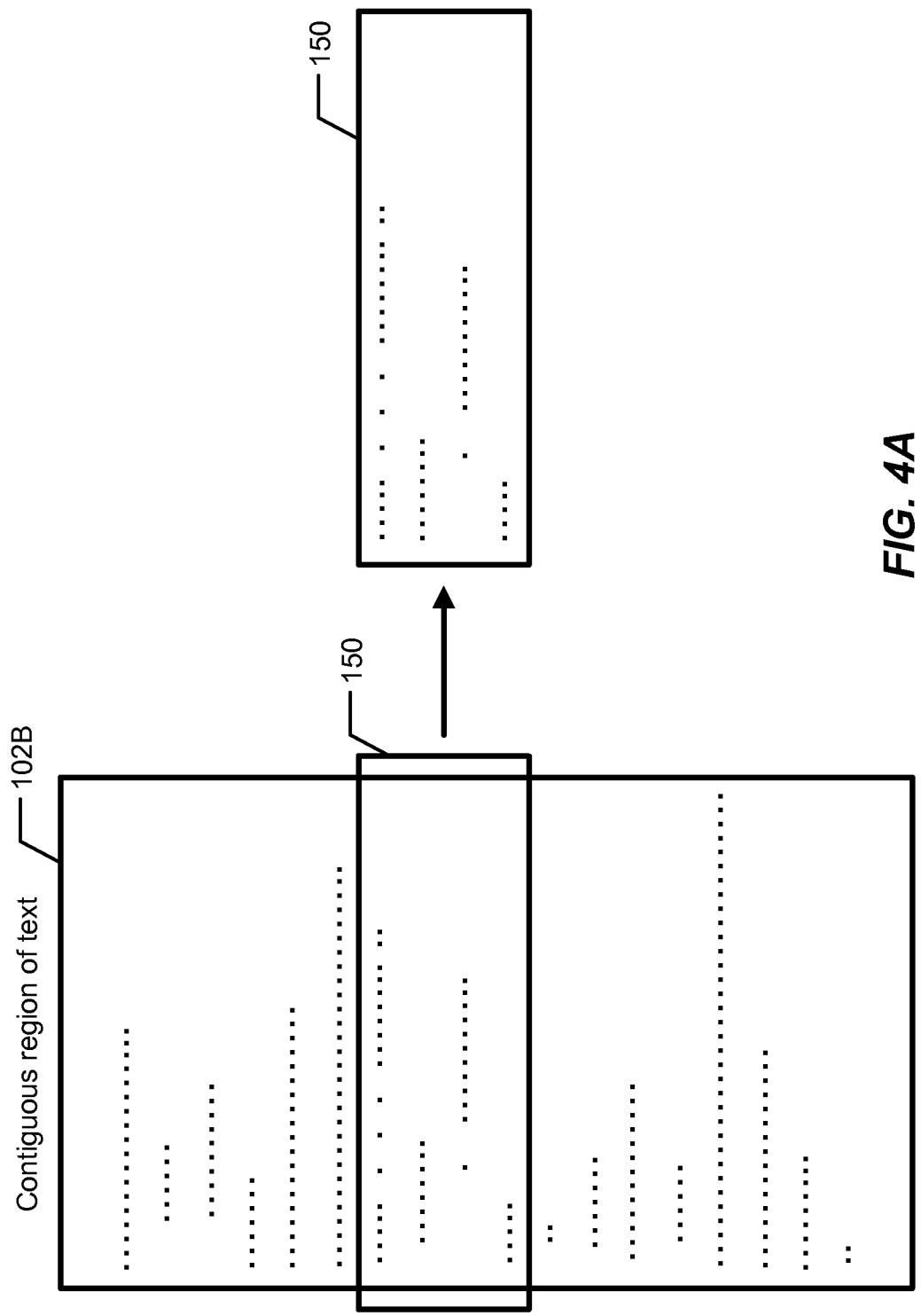
FIGS. 4A and 4B illustrate region selection and definition in text.
Figure 4B:
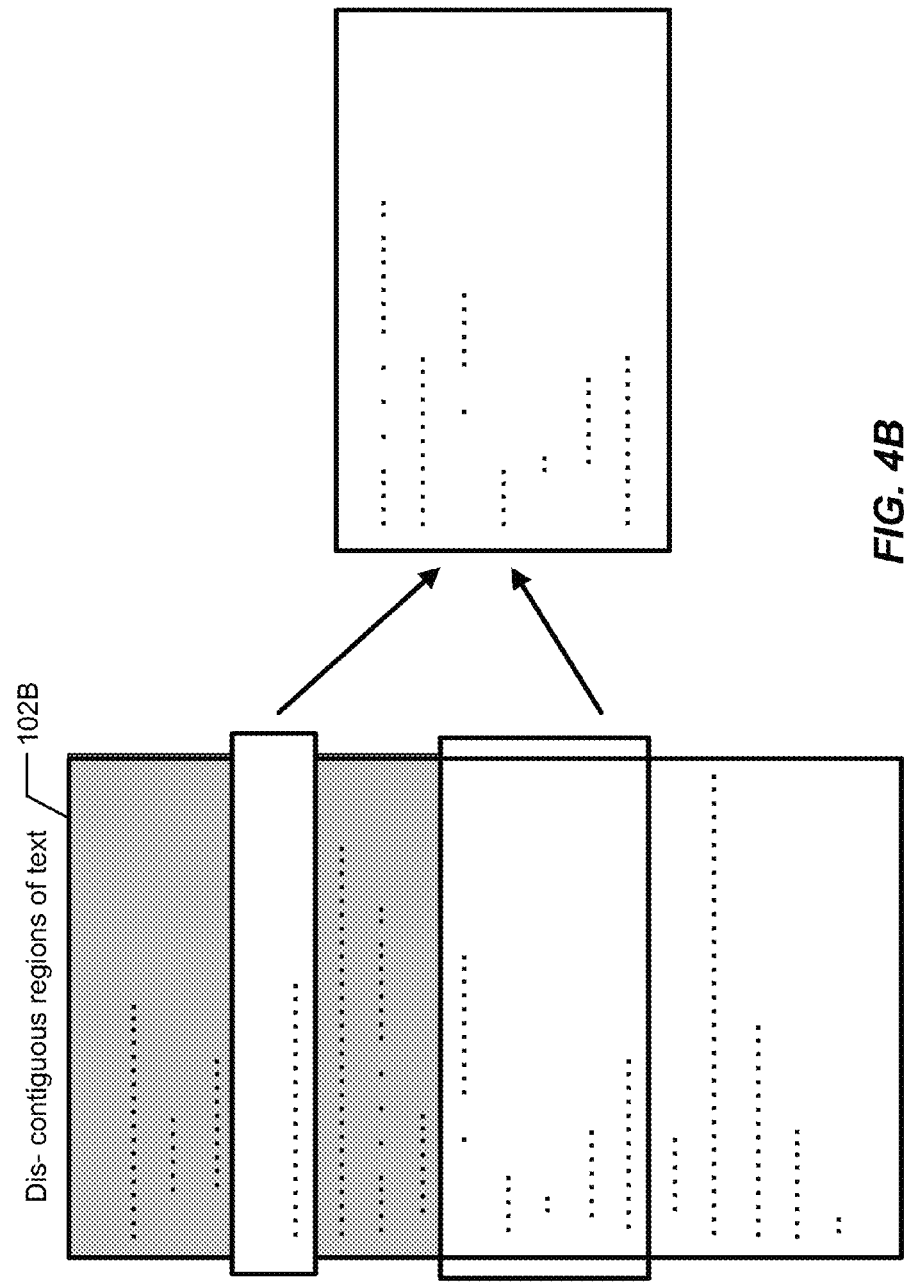

As seen in FIG. 4A regions of text 150 may be defined and selected by several parameters such as: character/byte offsets, line numbers, substrings or substring patterns (e.g. regular expressions), and structural or semantic blocks (e.g. a paragraph, a function definition source code, an XML element/subtree etc).

Figure 4C:
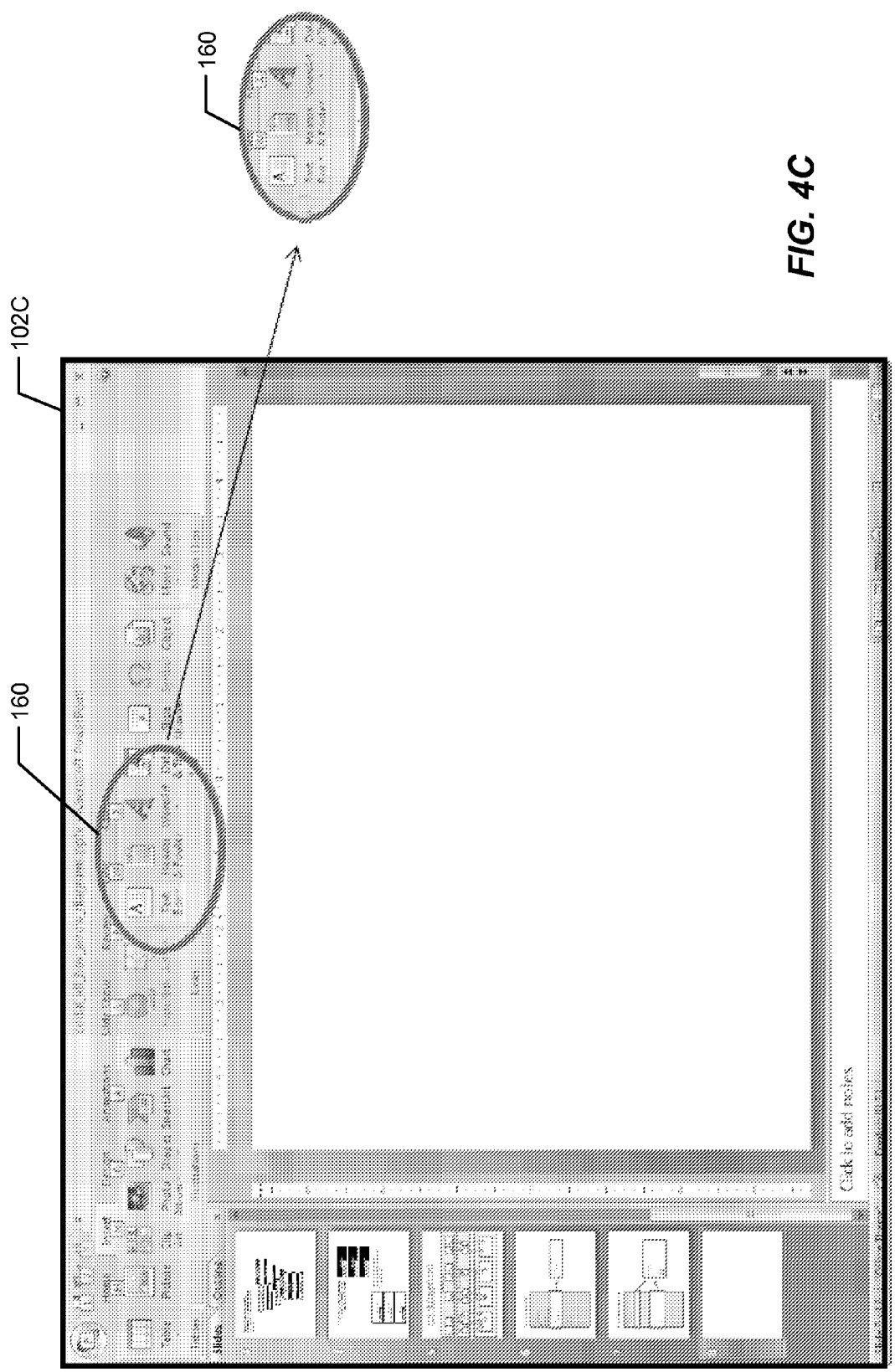
FIGS. 4C and 4D illustrate region selection and definition in an image.

As seen in FIG. 4C, image portions 160 may be integrated into a codal and referred to by location within original image object 102C.

Figure 4D:
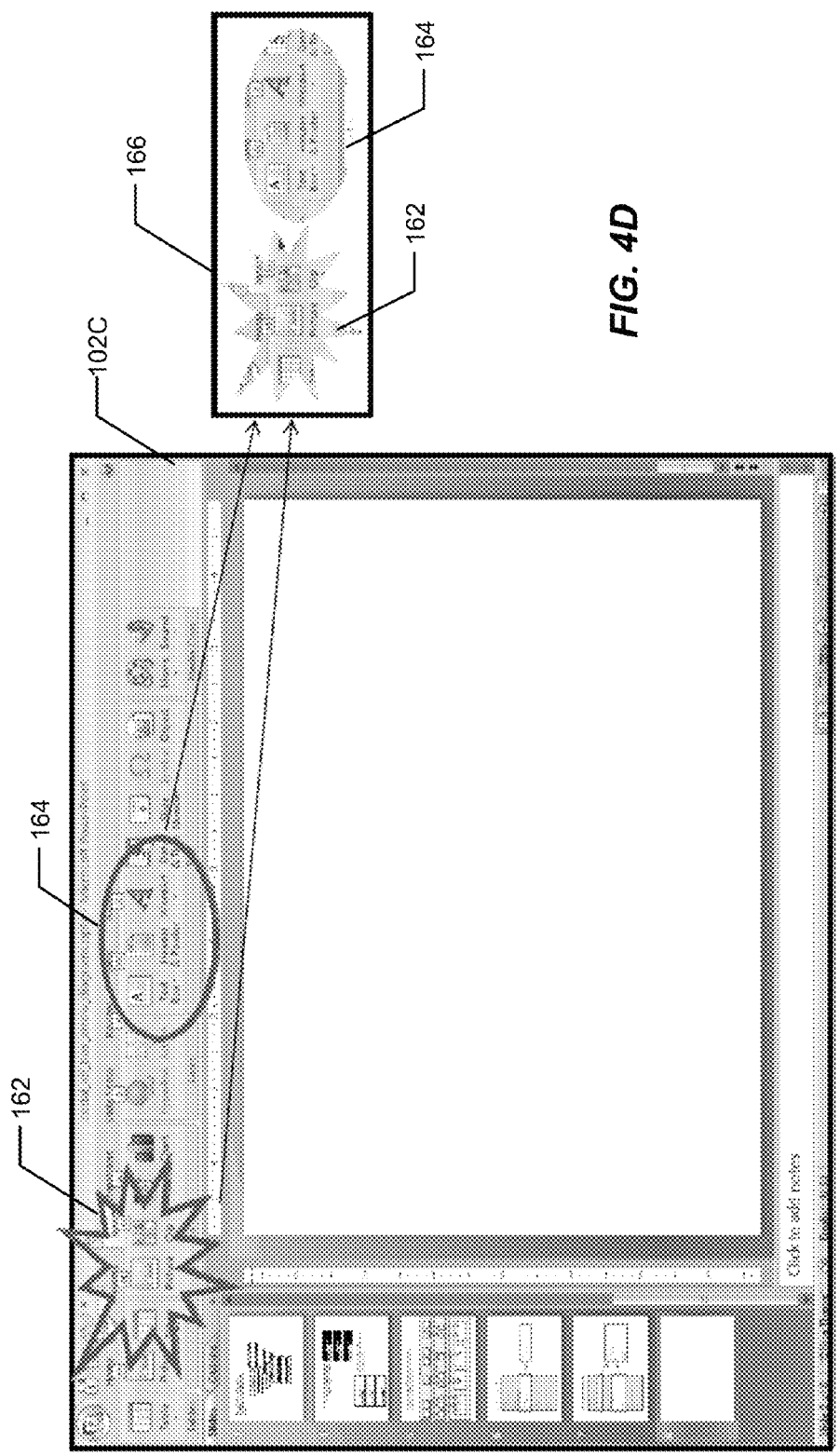

FIG. 4D illustrates that multiple dis-contiguous regions 162 and 164 may be selected and integrated into a codal. The regions may be collectively integrated as represented by box 166, and the relative position in regard to the original image 102C may be preserved. It should be noted that the relative position may be altered and that the shapes of the regions may vary and need not be rectangular.

Figure 4E:
FIGS. 4E and 4F illustrate region selection and definition in video.
Figure 4F:
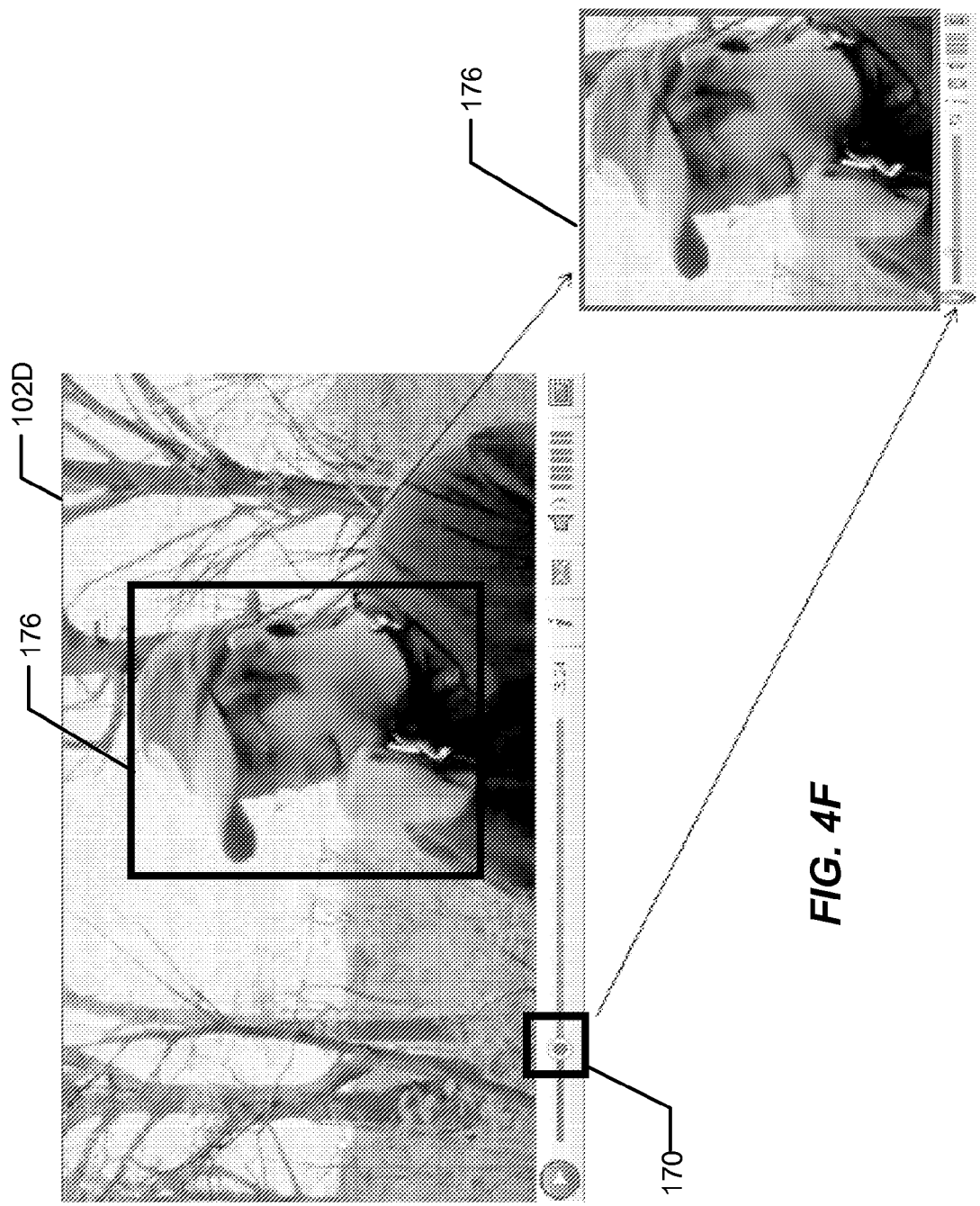
Figure 4G:
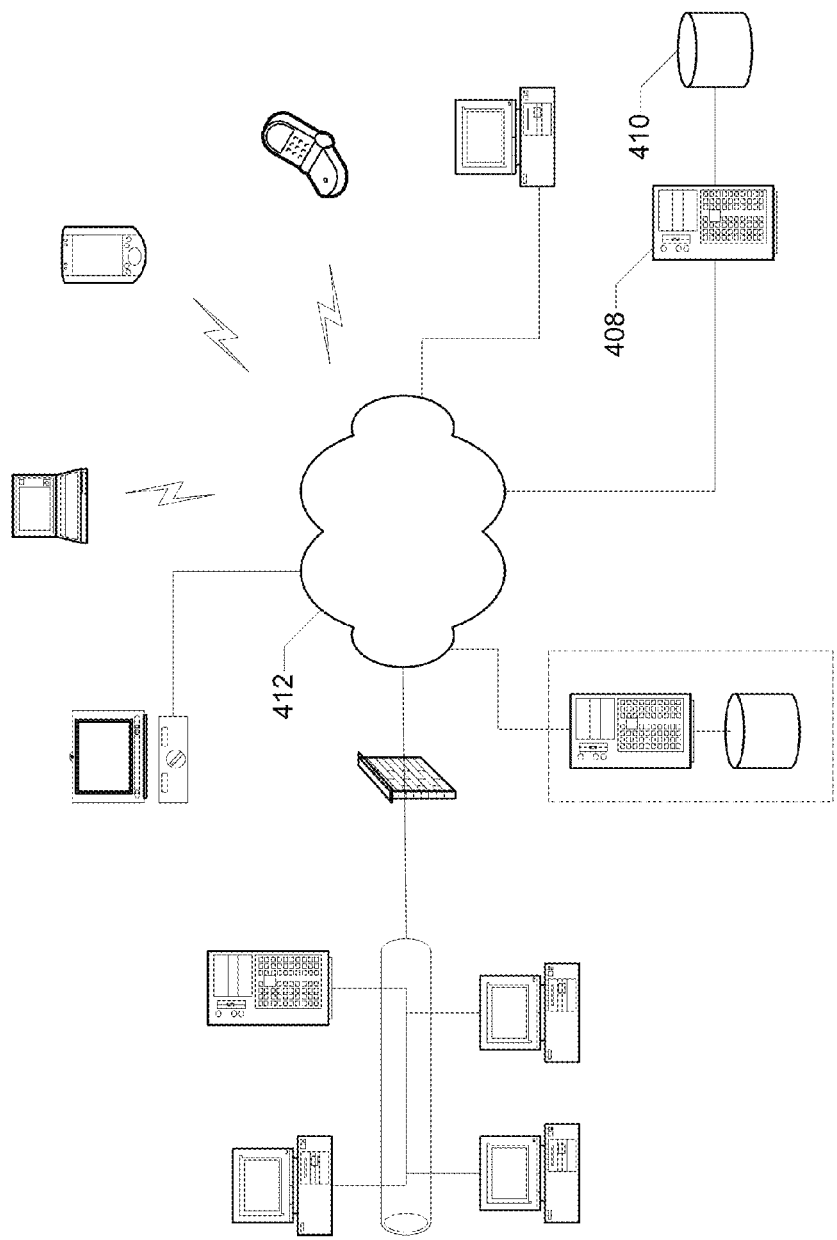
FIG. 4G is a simplified diagram of a computing environment in which embodiments of the invention may be implemented.

FIG. 4E illustrates that a temporal snippet 172 from a video may be excerpted. Temporal region 170 of original source video 102D is excerpted as a temporal video snippet 172. Multiple temporal regions can be selected and composited. The regions need not be contiguous, and relative position of dis-contiguous regions need not be preserved. As seen in FIG. 4F, a spatial and temporal snippet may be defined by temporal region 170 and spatial region 176. Spatial region 176 and temporal region 170 are a fractional/selected portion of the original video material.

For more information on resource identifiers and excerpting media objects, please refer to U.S. patent application Ser. No. 12/182,111, filed Jul. 29, 2008 and entitled "REGION AND DURATION UNIFORM RESOURCE IDENTIFIERS (URI) FOR MEDIA OBJECTS," hereby incorporated by reference in the entirety.

Figure 5A:
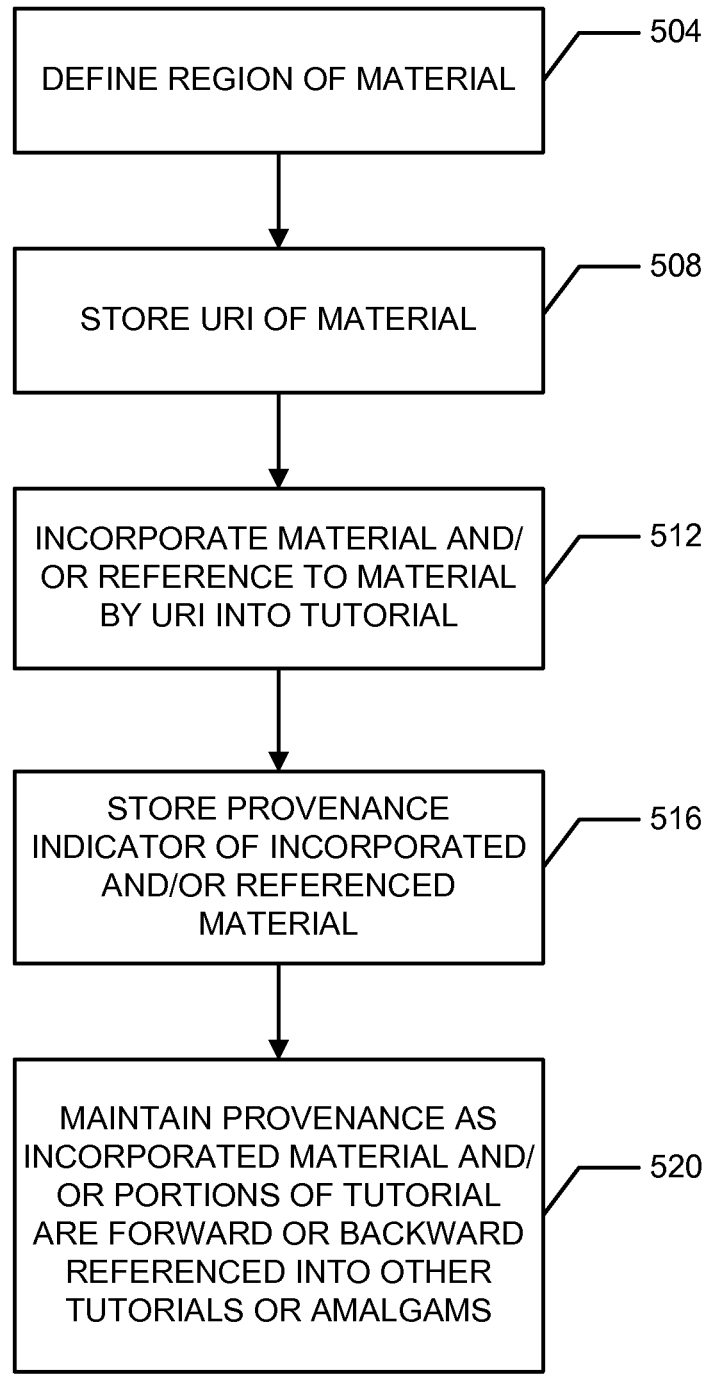
FIG. 5A is a flow chart illustrating tutorial creation and provenance tracking

FIG. 5A is a flow chart illustrating tutorial creation and provenance tracking. In step 504, a region of material to be referenced or directly incorporated is defined, as discussed above with regards to FIG. 4. The definition may, for example, comprise temporal and/or spatial bounds for a video or image file, and for a text file, may comprise a byte offset, line number, substring or substring pattern, structural or semantic blocks, function definitions in source code, XML element and subtrees. Also, as mentioned above, excerpted or referenced regions may be contiguous or discontiguous.

In step 508, a universal resource identifier for the excerpted or referenced material is stored in a data store and/or memory of the creation system (described below with regard to FIG. 4G). In step 512, the defined material is incorporated into the tutorial, and the URI is stored directly in the tutorial and/or in an external database of the system.

In step 516, provenance indicators for material are also stored in the tutorial and/or an external database of the system. As the underlying material may be revised and updated at any time, as may the tutorial, embodiments will keep track of revisions, and maintain the provenance indicators so as to keep them current, as will be discussed below, and as is represented by step 520. The material may be forward or backward referenced into other tutorials or amalgams, and such references will also be maintained as the tutorials, amalgams, and underlying materials are updated.

Embodiments allow a user to provide a link back to the full source context. This may be used for any number of things such as voting, favoriting, tagging, and commenting etc. Images, screenshots, and screencasts etc. may be annotated with links between interface elements and rendering code (e.g., firefox—view selection source; firebug—inspect element; etc). In certain embodiments, screencasts are automatically generated from snippets and narratives. Text-to-speech audio tracks may also be included in a codal. For audio tracks, both temporal bounds and channels or tracks may be excerpted and linked.

The system may be used not only to generate tutorials but also to organize and search them. For example, it may be used to find common patterns of coding across tutorials as a method for refactoring APIs, etc. Common patterns of coding may be used as material for readily copy-able snippets. Similar tutorials may be grouped by their shared code snippets and the system can identify alternative implementations or explanations, and offer them to the user as added information In prior methods, code documents have to be reorganized into a narrative structure that does not necessarily map well to either the structure of the code, or the practice of writing it. Prior systems and techniques impose a strict, single perspective on that process/practice, and do not really conform to the known practices of copy-paste programmers on the web. Furthermore, prior systems do not make any concessions for the specific/special nature of programs as documents which exist in a complex web of interdependencies, which are meaningfully pointed to and referenced more intelligently (than a semantically meaningless hyperlink) in the disclosed embodiments.

Exemplary Illustrative Scenarios

Sam's friend Mary uploaded photos from her recent trip to Flickr, a well-known image and video hosting web site. She geotagged them on Flickr and wanted to put a map on her homepage where people could see where she had gone, and view all the photos. She asked Sam how she might do this. Sam looked at the Flickr Maps feature which is part of the Flickr site, and realized that it wouldn't do what Mary wanted, so he decided to write a simple script to help her out. Sam had been hearing some interesting things about the Yahoo! User Interface (YUI), specifically the new Get feature which would allow him to pull down the data without having to use a server-side proxy.

Sam goes to Codal and searches for YUI and finds a tutorial on how to do a basic YUI Get. He manages to recreate the example on his own server, and gets it running Sam adds the call to Flickr to pull down the photo data, and then adds a map using some code he found in a Yahoo! Maps Codal on how to add icons and popups to a map.

Sam gives the application to Mary who installs it on her homepage. Afterwards, Sam thought other people might be interested in seeing how he built the application for Mary. Sam had been keeping the code for the webpage in his Github account, which makes sharing the code very easy, but he wanted to be able to provide better explanation for what was going on (and why) than he could using in-line comments, so he decides to create a Codal.

Sam goes to the Codal website and creates a new Codal. He names it "Creating a Flickr Map with YUI" and gives it a short description. For the first step, he describes everything which will be needed for completing the codal, specifically a Flickr API key, a Yahoo! Maps API key, a good text editor, and a web browser. Sam links to a Codal he found which was published by the Flickr team on how to sign up for a Flickr API key. He links to the Yahoo! Maps API key signup page. He also links to his favorite code editor (TextMate) and his browser of choice for development (Firefox with the Firebug extension).

Sam then tracks down the Codal he used for getting started with YUI Get. He only needs the first two steps which discuss including YUI and setting up the YUI environment, so he clips them and embeds them into his codal as the second and third steps. Sam then creates a fourth step for how to pull in the data from Flickr. He adds a description for what he is doing, and wants to include a snippet of code from his application. Sam creates a snippet and navigates the snippet selection tool to his repository on Github, where he highlights the lines of code he wants to include in this step. He creates the snippet from the selected lines of code and they are embedded into the fourth step of his Codal. Sam repeats this process until he has documented the entire process of writing the webpage, including all the necessary steps for geocoding the photos, and placing them on the map.

Provenance

In an embodiment, remixed content in Codal retains information about its origin, this includes information of the original context in which it was created, the original author/creator, date of creation, etc. As content is remixed and modified in derivative objects, the system tracks the lineage of remix, allowing for the entire provenance of remixed material to be interrogated.

In such an embodiment, a codal is a hierarchical object and comprises descriptive metadata elements and a set of steps which describe the tutorial content of the codal. Steps contain a metadata block, annotations, and snippets. Annotations are descriptions associated with the step; they can take multiple media forms but are most often text or structured text. Snippets are samples/extractions of information from one (or more) source(s). Snippets comprise resource identifiers, as discussed above, which identify source(s) and provide information about how to retrieve them (e.g., a URL), and a set of boundaries which specify what information from the source(s) is to be extracted. Every entity in the codal system has a unique identifier, including each codal tutorial, and every step within every codal. Annotations and snippets within steps also have identifiers.

Provenance information can be tracked at multiple levels:
1. Codal;
2. Step within a codal;
3. Annotation in a step; and
4. Snippet in a step.

The hierarchical structure of the codal object allows for remix mechanisms to be applied recursively, where remixing at a high-level can be accomplished through the composition/aggregation of remix operations at lower-levels. For example, remixing an entire codal consists of remixing all of the steps of the codal, which in turn consists of remixing the annotations and snippets associated with each step.

When content is remixed, the information in the object is copied, and associated metadata is updated. The copied information can be modified by the copier. Details of how metadata is updated are described below. Modifications to content are made to the copy, not the original, and are attributed to the copier.

Metadata Descriptors

All content objects in a codal contain descriptive metadata which include (but are not limited to) information about who authored the object, when it was authored, as well as any source information about where the content came from.

In the simple case when a new content object (i.e., Codal, Step, Annotation, or Snippet) is created from scratch (not copied), the metadata are populated with information about that initial creation, e.g., creation is attributed to the user who created the object.

There are several scenarios for how the metadata are updated when content objects are or comprise remixes (created by copying from another content object). These cases are enumerated below:

No Embedded History

In this scenario, the old metadata are overwritten to reflect the current context of creation, e.g., creation is attributed to the copier, the moment of creation is set to the moment of copy, etc. This method of updating the metadata does not preserve any provenance information in the current object.

In this scenario, any provenance information would be tracked externally to the copy. The provenance information may be preserved in a database, or in the source objects which were copied.

Example: Jane copies an object created by Mary

| Original Object | Remixed Object |
|---|---|
| <creator> Mary Smith</creator><br><date type="created">2009-06-25</date> | <creator> Jane Roberts</creator><br><date type="created"> 2009-07-06</date> |

It should be noted that this is typically what happens when media like music is sampled and remixed into new songs. All attribution and provenance information is stripped at the moment of copy. In some cases, that information may be preserved externally (for rights clearance or licensing purposes).

This method has as advantages that it does not encumber the objects with their history information, that the complexity of objects does not grow over time, that because provenance is stored in a separate database, building a world-view of all remixing activity is immediate, and that content is easily distributable and scalable as entities are loosely connected. However, it requires external tracking of provenance, and obtaining provenance of an object requires querying separate/multiple sources, which is time consuming and potentially problematic if one of many sources is not available for query.

Back-Reference to Predecessor

In this scenario, the old metadata are preserved and renamed to reflect that they describe information about the creation of the object which preceded the current one. Additionally, the identifier of the preceding object is stored in the metadata description. New metadata descriptors are added to describe the current context of creation.

Example: Jane copies an object created by Mary

---

Original Object
    <uri>tag:codal:2009-06-25:112412</uri>
    <creator> Mary Smith</creator>
    <date type="created">2009-06-25</date>
Remixed Object
    <uri>tag:codal:2009-07-06:211759</uri>
    <creator> Jane Roberts</creator>
    <date type="created"> 2009-07-06</date>
    <provenance>
        <predecessor> tag:codal:2009-06-06-25:112412</predecessor>
        <creator > Mary Smith</creator>
        <date type="created"> 2009-06-25</date>
    </provenance>

---

Example: Bob remixes content from Jane and from Mark

---

<uri>tag:codal:2009-07-08:234163</uri>
    <creator>Bob Stewart</creator>
    <date type="created"> 2009-07-08</date>
    <provenance>
        <predecessor>
            <uri> tag:codal:2009-07-06:211759</uri>
            <creator > Jane Roberts</creator>
            <date type="created"> 2009-07-06</date>
        </predecessor>
        <predecessor>
            <uri> tag:codal:2009-06-15:102329</uri>
            <creator > Mark Callahan</creator>
            <date type="created"> 2009-06-15</date>
        </predecessor>
    </provenance>

---

This technique has the advantages that provenance information is preserved with the content, full provenance histories can be reconstructed by recursively querying predecessors, objects are bounded in size and complexity to just a single generation of information, and that efficient storage is achieved as each source-derivative relationship is only represented once. However, obtaining the full provenance of an object requires querying multiple sources and it may be difficult to determine everything which was derived from a given source.

Back-Reference to Entire Remix History

In this scenario, the entire provenance history is copied and added to with each subsequent generation of remixing. In the examples below, generations are counted backwards relative to the current generation (i.e., read as "generations ago").

Example: Bob copies the object copied by Jane

---

Jane's 'Original' Object
    <uri>tag:codal:2009-07-06:211759</uri>
    <creator> Jane Roberts</creator>
    <date type="created"> 2009-07-06</date>
    <provenance>
        <predecessor>
            <uri>tag:codal:2009-06-25:112412</uri>
            <creator> Mary Smith</creator>
            <date type="created">2009-06-25</date>
        </predecessor>
    </provenance>
Bob's Remixed Object
    <uri>tag:codal:2009-07-08:234163</uri>
    <creator>Bob Stewart</creator>
    <date type="created"> 2009-07-08</date>
    <provenance>
        <predecessor generation="1">
            <uri> tag:codal:2009-07-06:211759</uri>
            <creator > Jane Roberts</creator>
            <date type="created"> 2009-07-06</date>
        </predecessor>
        <predecessor generation="2">
            <uri>tag:codal:2009-06-25:112412</uri>
            <creator> Mary Smith</creator>
            <date type="created">2009-06-25</date>
        </predecessor>
    </provenance>

Where an object is remixed from multiple sources, multiple provenances would be copied.

Example: Bob remixes content from Jane and from Mark

```
<uri>tag:codal:2009-07-08:234163</uri>
<creator>Bob Stewart</creator>
<date type="created"> 2009-07-08</date>
<provenance>
    <predecessor generation="1">
        <uri> tag:codal:2009-07-06:211759</uri>
        <creator > Jane Roberts</creator>
        <date type="created"> 2009-07-06</date>
    </predecessor>
    <predecessor generation="2">
        <uri>tag:codal:2009-06-25:112412</uri>
        <creator> Mary Smith</creator>
        <date type="created">2009-06-25</date>
    </predecessor>
</provenance>
<provenance>
    <predecessor generation="1">
        <uri> tag:codal:2009-06-15:102329</uri>
        <creator > Mark Callahan</creator>
        <date type="created"> 2009-06-15</date>
    </predecessor>
</provenance>
```

This technique has the advantages that full provenance of any object is known without further querying, and of redundant storage of relationships. However, it is not as efficient as some other techniques, as the same source-derivative relationship will be represented in multiple objects, and object sizes may bloat in later-generations of remixes.

Forward-Reference to Successor

In this scenario, provenance is not stored in the derivative works, but rather in the original works from which subsequent content was derived.

Example: Jane copies an object created by Mary

```
Original Object before copy
<uri>tag:codal:2009-06-25:112412</uri>
<creator> Mary Smith</creator>
<date type="created">2009-06-25</date>
Original Object after copy
<uri>tag:codal:2009-06-25:112412</uri>
<creator> Mary Smith</creator>
<date type="created">2009-06-25</date>
<derivatives>
    <successor generation="1">
        <uri>tag:codal:2009-07-06:211759</uri>
        <creator> Jane Roberts</creator>
        <date type="created"> 2009-07-06</date>
    </successor>
</derivatives>
Remixed Object after copy
<uri>tag:codal:2009-07-06:211759</uri>
<creator> Jane Roberts</creator>
<date type="created"> 2009-07-06</date>
```

This technique has the advantage that it allows easy/immediate inspection of derivative works. However, a given object does not contain information of its own history/origin.

Forward-Reference to Entire Derivation Line

In this scenario, provenance is not stored in the derivative works, but rather in the original works from which subsequent content was derived. Descriptions of the entire derivation line are preserved in the original document.

Example: Dan copies an object created by Jane who copied an object created by Mary.

```
Original Object before copy
<uri>tag:codal:2009-06-25:112412</uri>
<creator> Mary Smith</creator>
<date type="created">2009-06-25</date>
Original Object after copy
<uri>tag:codal:2009-06-25:112412</uri>
<creator> Mary Smith</creator>
<date type="created">2009-06-25</date>
<derivatives>
    <successor>
        <uri>tag:codal:2009-07-06:211759</uri>
        <creator> Jane Roberts</creator>
        <date type="created"> 2009-07-06</date>
        <successor>
            <uri>tag:codal:2009-07-09:221312</uri>
            <creator>Dan Fields</creator>
            <date type="created"> 2009-07-09</date>
        </successor>
    </successor>
</derivatives>
```

This technique has advantages in that it provides easy/immediate inspection of the entire derivation line, and redundant storage of relationships. However, a given object does not contain information of its own history/origin, and copy actions require back-propagation and updating of sources (recursively) which is slow/expensive. Duplicate information may also result in bloated object size.

Combinations of the Above

The above techniques and methods are not mutually exclusive and can be combined, whereby provenance information is stored in both derived works and original sources, to varying degrees of completeness.

Examples of ways of sampling/remixing are as follows: 1.) Adapt/tweak a codal: copy the entire codal and make changes to the copy; 2.) Extend a codal: copy an entire codal and add steps to it; 3.) Sample-without-edit (include): copy a step without modification to the annotation or snippet being copied; and 4.) Sample-with-edit (remix): copy a step and make modifications to the annotation or snippet being copied.

Some notions of provenance tracking work at a high-level of granularity, even when only a portion of the content has been remixed. An example of this is remixing in music, where provenance diagrams contain links among songs where one song has sampled another. The link contains no information about what or how much content was remixed.

Embodiments herein track provenance information at the "step" level, where "step" is defined as a portion of the instruction which may contain a source code snippet, and/or a description or annotation. Steps also contain information about their creation, such as when they were created, by whom, and for which codal.

There are several layers of provenance information being tracked in the disclosed embodiments. First, the source code snippets in the steps are defined through connections to active code repositories which link the snippet to its original source. Second, the step as a whole contains a link to its predecessor (if any), meaning if a step (the source) has been copied, the original description of the step is duplicated (the derivative), and a link is formed connecting the derivative step to the source step.

By recursively following the link between a derivative and its source, a chain of provenance can be reconstructed which connects any derivative to an ancestry of sources. Examining the overlapping provenances of all steps in all codals will produce a tree structure (or directed acyclic graph), resembling a family tree or stemma.

While the provenance tracking is similar in some regards to revision control systems, it enables better and more flexible tracking. Revision control systems track the history of objects over a series of edits/revisions. The disclosed embodiments track the provenance of objects as they are remixed into different contexts whereas revision control systems track the provenance of an object in a single context. In revision control systems, instantiation between or across contexts is not tracked or linked in any way.

The provenance tracking employed by the disclosed embodiments is also distinct from watermarking. Watermarking is primarily used to track the use of copyrighted material. Watermarking adds a (possibly invisible to the eye) mark to a work which allows it to be identified as belonging to a known owner or coming from a known source. This establishes the origin of the work, but does not preserve the intermediate handling and manipulation of the work.

Figure 5B:
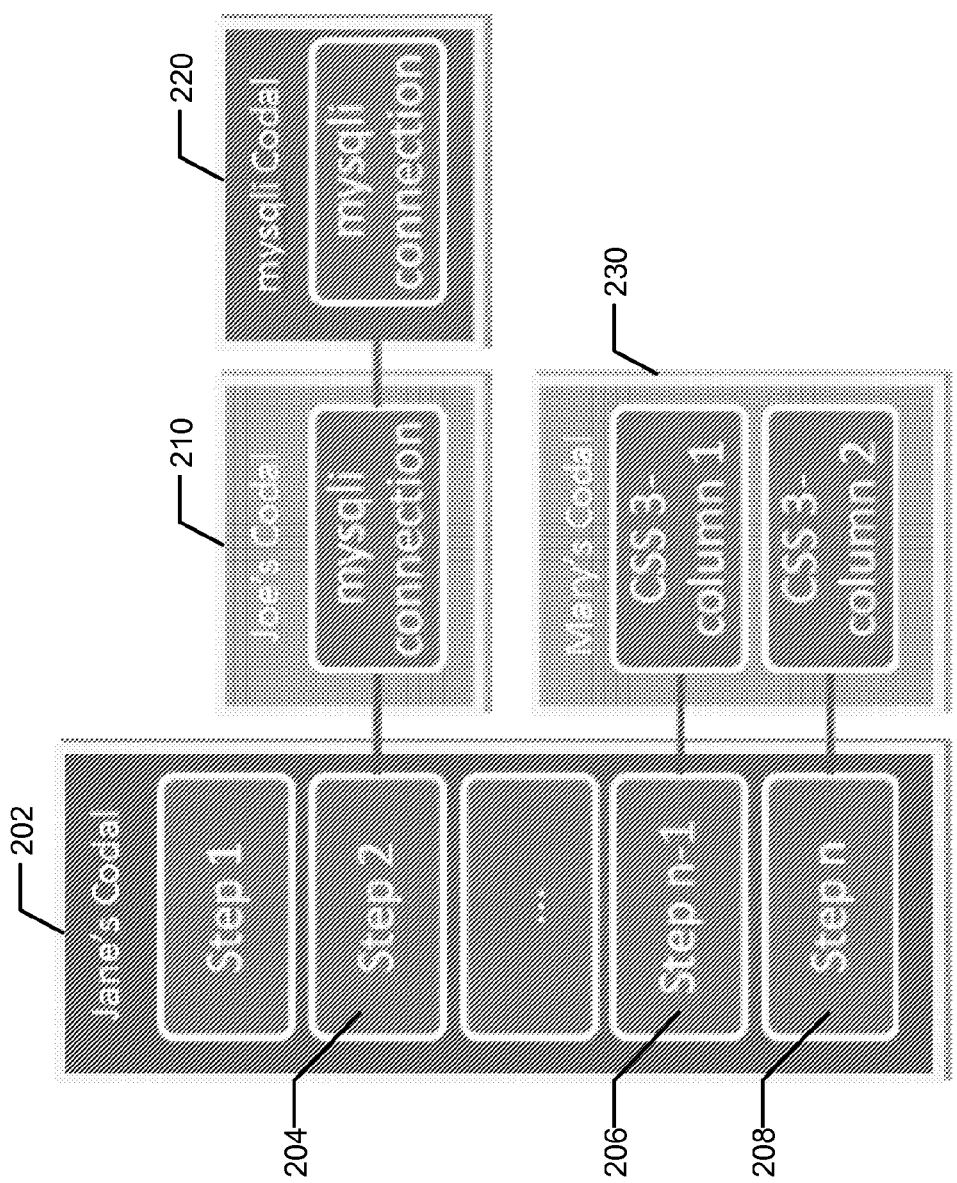
FIG. 5B illustrates provenance inter—relationships and tracking

FIG. 5B is a diagram illustrating a relatively simple example scenario of codals and provenance tracking.

Mary has created a codal describing how to do three-column layouts using cascading style sheets (CSS) which are used for describing the look and formatting of a document written in a markup language. Her codal contains two simple steps which explain the technique.

Joe creates a codal describing how to write a blog-style comment system for a web-page using php, a well-known server-side scripting language. In this codal, Joe has a step for setting up the database connection using the mysqli library in php. mysqli is an extension of mysql, a well-known open source relational database management system. Joe remixed an example created by the author of the mysqli library, and added a nice explanation which is aimed at novice programmers, helping them make sense of the techno-jargon used in the original example.

Jane wants to write up a codal explaining how she built her new simple blog in php. Jane starts writing her codal and gets to the part where she needs to explain how to use the mysqli library for connecting to the db. She remembers using Joe's codal when she was coding up her site, so she searches and finds Joe's codal and selects the one step in which he describes setting up the db connection. Jane revises the description a bit so it fits into her narrative better. Jane finishes up explaining all the back-end code and is ready to explain how to code up the front-end. Jane originally wrote her site with a simple, single-column layout, but wants to give people some ideas for improving her design. She finds Mary's codal on how to do three-column layouts in CSS and decides that it looks easy enough. She adds the two steps from Mary's codal to the end of her codal. Jane has to modify the descriptions to explain how the style definitions map to her HTML.

In this scenario, as seen in FIG. 5B, Jane's codal 202 contains several steps, three of which are remixed from other sources. The first remixed step ("step 2", 204) points back to the step in Joe's codal 210, which in turn points back to the step in the mysqli codal 220. The second and third remixed steps ("step n−1", 206; "step n", 208) point to the two steps in Mary's codal 230.

Tutorials and other amalgams may be created and maintained in accordance with an embodiment of the invention in some centralized manner. This is represented in FIG. 4G by server 408 and data store 410 which, as will be understood, may correspond to multiple distributed devices and data stores. The tutorials and content therein and referenced thereby may be accessed by a search engine, such as that provided by Yahoo!. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

The above described embodiments have several advantages. Embodiments facilitate programming and keep track of the resources and remixes and modifications of the resources. Thus, updates to material referenced in a tutorial created by the disclosed embodiments can be noted and made accessible after the tutorial has been created. Also, there are several layers of provenance information being tracked in certain embodiments and provenance can be tracked even through multiple samplings of material, only a portion of which may have been incorporated into an intermediate link in the chain of provenance. By recursively following the link between a derivative and its source, a chain of provenance can be reconstructed which connects any derivative to an ancestry of sources.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system for creating instructional tutorials and tracking provenance of materials incorporated or referenced therein, the computer system comprising:
    a processor; and
    a memory, at least one of the processor or the memory being configured to:
    receive a selection of material from original resource objects or derivatives thereof, wherein the selected material includes program code;
    define the selected material by a universal resource identifier and a boundary specification;
    excerpt the selected material and create a snippet from the excerpted material;
    integrate the snippet and a narrative description into a tutorial;
    track the provenance of the selected material and the snippet back to an original resource object of the original resource objects, wherein tracking the provenance of the selected material includes tracking derivatives of the selected material within a chain of provenance, wherein tracking derivatives of the selected material includes tracking modifications or remixes of the selected material by storing metadata pertaining to the derivatives of the selected material; and
    reference the original resource object and any human contributors to the derivatives in the chain of provenance in the tutorial.

2. The computer system of claim 1, wherein the selected material comprises a video file, and wherein the computer system is further configured to define a temporal boundary specification less than the entirety of the original video file.

3. The computer system of claim 1, wherein the selected material comprises a video file, and wherein the computer system is further configured to define a spatial boundary specification less than the entire display area of the original video file.

4. The computer system of claim 1, wherein the selected material comprises a file, and wherein the computer system is further configured to define a spatial boundary specification less than the entire display area of the file.

5. The computer system of claim 1, wherein the selected material comprises a file, and wherein the computer system is further configured to define a spatial boundary specification that comprises two or more dis-contiguous regions, each region less than the entire display area of the file.

6. The computer system of claim 1, wherein the selected material comprises text and wherein the computer system is further configured to define a boundary specification by a string.

7. The computer system of claim 1, wherein the selected material comprises text and wherein the computer system is further configured to define a boundary specification by a byte offset or line number.

8. The computer system of claim 1, wherein the selected material comprises text and wherein the computer system is further configured to define a boundary specification by a function definition in source code.

9. The computer system of claim 1, wherein the selected material comprises text and wherein the computer system is further configured to define a boundary specification by an extensible markup language (XML) element subtree.

10. The computer system of claim 1, wherein the selected material comprises text and wherein the computer system is further configured to define dis-contiguous regions of text.

11. The computer system of claim 1, wherein the computer system is configured to track the provenance of each step of the tutorial individually.

12. The computer system of claim 1, wherein the computer system is configured to change the display size of the snippet in comparison to size of an area containing the narrative description.

13. The computer system of claim 1, wherein the computer system is configured to assign each tutorial a unique identifier, and wherein the computer system is further configured to track the provenance using the unique identifier.

14. The computer system of claim 1, wherein the computer system is configured to create a set of steps, each step comprising a metadata block, an annotation, and a snippet, and wherein the system is configured to assign each step a unique identifier, and to track the provenance of the material of each step using the unique identifier.

15. The computer system of claim 14, wherein the computer system is further configured to assign each annotation and each snippet within a step a unique identifier, and wherein the computer system is configured to track the provenance of the material of each annotation and each snippet within a step by the unique identifier.

16. The computer system of claim 1, wherein the computer system is further configured to determine when any content within the tutorial is remixed, and to make a copy of the tutorial or sub portion thereof, and to allow a user to modify the copy or portion thereof but not the content.

17. The computer system of claim 1, wherein the snippet includes the program code.

18. A method for creating instructional tutorials and tracking provenance of materials incorporated or referenced therein, comprising:
receiving, by a processor, a selection of material from original resource objects or derivatives thereof, wherein the selected material includes program code;
defining the selected material by a universal resource identifier and a boundary specification;
excerpting the selected material and creating a snippet from the excerpted material;
integrating by a processor the snippet and a narrative description into a tutorial;
tracking the provenance of the selected material and the snippet back to an original resource object of the original resource objects, wherein tracking the provenance includes tracking the provenance of derivatives of the selected material within a chain of provenance, wherein tracking derivatives of the selected material includes tracking modifications or remixes of the selected material by storing metadata pertaining to the derivatives of the selected material;
referencing the original resource object and any human contributors to the derivatives in the chain of provenance in the tutorial.

19. The method of claim 18, wherein the selected material comprises a file, and wherein the method further comprises defining a temporal boundary specification less than the entirety of the original file.

20. The method of claim 18, wherein the selected material comprises a file, and wherein the method further comprises defining a spatial boundary specification less than the entire display area of the of the original file.

21. The method of claim 18, wherein the selected material comprises an image file, and wherein the method further comprises defining a spatial boundary specification less than the entire display area of the image file.

22. The method of claim 18, wherein the selected material comprises a file, and wherein the method further comprises a spatial boundary specification that comprises two or more dis-contiguous regions, each region less than the entire display area of the file.

23. The method of claim 18, wherein the selected material comprises text and wherein the method further comprises defining boundary specification by a string.

24. The method of claim 18, wherein the selected material comprises text and wherein the method further comprises defining a boundary specification by a byte offset or line number.

25. The method of claim 18, wherein the selected material comprises text and wherein the method further comprises defining a boundary specification by a function definition in source code.

26. The method of claim 18, wherein the selected material comprises text and wherein the method further comprises defining a boundary specification by an extensible markup language (XML) element subtree.

27. The method of claim 18, wherein the selected material comprises text and wherein the method further comprises defining dis-contiguous regions of text.

28. The method of claim 18, further comprising tracking the provenance of each step of the tutorial individually.

29. The method of claim 18, wherein the method further comprises changing the display size of the snippet in comparison to the size of an area containing the narrative description.

* * * * *